Patented Sept. 1, 1953

2,650,929

UNITED STATES PATENT OFFICE 2,650,929

PROCESS FOR ISOLATION OF CHOLESTEROL FROM WOOL WAX ALCOHOLS

Colin Leslie Hewett, Lancaster Place, London, England

No Drawing. Application February 28, 1949, Serial No. 78,896. In Great Britain February 27, 1948

5 Claims. (Cl. 260—397.2)

The present invention relates to a new or improved process for the isolation of cholesterol (which is an important material for the manufacture of sex hormones) from the non-saponifiable component of wool grease known as wool wax alcohols.

It is well known that cholesterol can be isolated from wool wax alcohols but the yields hitherto obtained did not amount to more than 6–7%; and attempts to improve this yield have previously failed. The present invention furnishes a simple method for the isolation of purified cholesterol from wool wax alcohols with an improved yield which may amount to more than twice that previously obtained.

In accordance with the present invention cholesterol is isolated from the non-saponifiable component of wool grease by first separating unwanted iso-cholesterol by known means and thereafter purifying the cholesterol from wax-like impurities by selective crystallisation of the cholesterol or selective dissolution of the impurity at a temperature selected to separate the cholesterol from the said impurities.

In some cases part of the wax content may be first separated and in that case it is convenient to separate the cholesterol from a wax residue by crystallisation at a temperature lying in the range of 20 to 25° C. If desired however the preliminary separation of part of the wax content may be omitted and in such case separation of a mixture of the cholesterol and the wax-like impurity may be performed by selective dissolution of the impurity at a temperature lying in the range 30 to 35° C.

In carrying the present invention into effect the mixture of lanosterol and agnosterol, known as "iso-cholesterol" is first removed by known methods, for example by crystallisation from methanol. If desirable the iso-cholesterol-free material is then dissolved in a simple ketone and allowed to cool, whereby sparingly soluble wax-like compounds separate which are removed by filtering. Where such separation is performed the solution, after freeing from these sparingly soluble wax-like compounds, is distilled to dryness and the residue dissolved in a suitable solvent, for example, a simple fatty acid such as acetic acid, or alcohol, and cooled to 20–25° C., and kept at this temperature for 1–2 hours, when the cholesterol separates in needles free from wax-like impurities. If the temperature is allowed to go below 20° C. the wax-like impurities separate together with the cholesterol and result in much loss when further purifying the cholesterol.

The following example illustrates this procedure:

Example I 1 kg. of wool wax alcohols is dissolved in 7 litres of boiling methanol and cooled to 42° C. After 2 hours at 42° C. the "iso-cholesterol" which has separated is filtered off. The "iso-cholesterol" is then recrystallised from 4 litres methanol at 42° C.

The two methanol solutions are combined and evaporated to dryness and the residue dissolved in 3 to 4.5 litres of acetone, and kept overnight at about 18° C. The wax-like compound which has separated is redissolved in 1–2 litres of hot acetone and cooled to 18° C. After 1 hour the wax-like compound is filtered off (100 gms).

The acetone liquors are combined and distilled to dryness and the residue dissolved in 1 litre glacial acetic acid at about 60° C. and slowly cooled to 22° C. and kept there 1 hour. The cholesterol, which separates in needles, is filtered off and washed with a little acetic acid until colourless. After drying it weighs 165 gms. Recrystallised from methylated spirits it yields 143 gms. M. P. 148–149° C. The acetic acid mother liquors on cooling further, deposit about 70 gms. of a wax.

Example II

This illustrates a procedure wherein preliminary removal of wax-like compounds is not performed. 66 lbs. of wool wax alcohols are treated with 370 lbs. of hot methanol as in Example I and the "iso-cholesterol" is filtered off.

The alcoholic solution containing the cholesterol is evaporated to dryness and the residue dissolved by heating in an equal weight of glacial acetic acid. This solution is then allowed to cool to room temperature when a mixture of cholesterol and waxy substances crystallises out. The temperature is then raised until the waxy substances are dissolved (at 35° C.) when the undissolved crystalline cholesterol is filtered off, the temperature of filtration being maintained so that no waxy substances come out. The cholesterol is washed with a little warm glacial acetic acid, then with methanol and then dried. This yields about 14 lbs. of crude cholesterol.

The crude cholesterol is recrystallised in the following manner:

The crude cholesterol is dissolved in one-and-a-half times weight/volume of industrial methylated spirits. It is then cooled when cholesterol crystallises out. This is filtered off and washed with methanol and dried.

Yield:
- 1st crop.—Approximately 11 lbs of purified cholesterol. Working of the mother liquors yields further small crops of cholesterol.

What I claim is:

1. A process for isolating cholesterol from the non-saponifiable component of wool grease comprising separating unwanted iso-cholesterol by crystallisation from methanol, evaporating the solution to dryness, dissolving the residue in acetone, separating a part of the wax-like compounds therefrom by crystallisation, evaporating the acetone solution to dryness, dissolving the residue in glacial acetic acid, and slowly cooling the solution to the range 20 to 25° C. to precipitate the desired cholesterol substantially free from wax-like impurities.

2. A process according to claim 1, wherein the wool grease is dissolved in boiling methanol which is then cooled to separate the unwanted iso-cholesterol and the latter is recrystallised from a further quantity of methanol, the two methanol solutions being then combined for further treatment.

3. A process according to claim 1, wherein the desired cholesterol, after precipitation, is filtered and washed with a little acetic acid and is then recrystallised from methylated spirit.

4. A process for isolating cholesteral from the non-saponifiable component of wool grease, comprising dissolving the wool grease in hot methanol, precipitating unwanted iso-cholesterol therefrom, evaporating the alcoholic solution to dryness, dissolving the residue in glacial acetic acid, cooling the solution to obtain a precipitate of cholesterol and wax-like impurities, raising the temperature of the mixture of precipitate and mother liquor to the temperature range 30 to 35° C. to dissolve selectively the wax-like impurities while leaving the crystallised cholesterol substantially undissolved and filtering off the cholesterol at such temperature that wax-like impurities are not deposited.

5. A process according to claim 4, wherein the filtered cholesterol is recrystallised from methylated spirits.

COLIN LESLIE HEWETT.

References Cited in the file of this patent

UNITED STATES PATENTS

| Number | Name | Date |
|---|---|---|
| 2,273,046 | Julian et al. | Feb. 17, 1942 |

OTHER REFERENCES

Office of Military Government for Germany Fiat, Final Report 902 (P. B. 78265), released Dec. 12, 1947, pp. 3–4 and 6.